United States Patent [19]

Gough

[11] 4,370,913
[45] Feb. 1, 1983

[54] AMMUNITION HANDLING SYSTEM

[75] Inventor: George T. Gough, Newcastle, England

[73] Assignee: Gough & Co. (Hanley) Ltd., Staffordshire, England

[21] Appl. No.: 189,041

[22] Filed: Sep. 22, 1980

[30] Foreign Application Priority Data

Jun. 2, 1980 [GB] United Kingdom ................. 8017981

[51] Int. Cl.³ .............................................. F42B 33/00
[52] U.S. Cl. .......................................... 86/45; 86/23; 414/419
[58] Field of Search ....................... 86/1 R, 23, 25, 32, 86/45; 141/231, 232, 233, 284; 221/186, 188; 222/166; 414/404, 419

[56] References Cited

U.S. PATENT DOCUMENTS

| 678,827 | 7/1901 | Morris | 86/45 |
| 2,726,779 | 12/1955 | Kendall | 414/419 |
| 4,223,588 | 9/1980 | Simpson | 86/45 |

FOREIGN PATENT DOCUMENTS 54-111989 9/1979 Japan ..................... 414/419

Primary Examiner—Leland A. Sebastian
Attorney, Agent, or Firm—Charles A. Brown

[57] ABSTRACT

The invention relates to an ammunition handling system in which a steel carrier is supported on a chain running along a cruciform track. The carrier has an inner lining (19) (FIG. 1) which is shaped so that when the carrier (10) is tipped from the position shown in FIG. 1, by turning it bodily in an anti-clockwise direction, ammunition contained within the liner will gently and smoothly run out into a receptacle.

The opening and closing of the door, the tipping of the carrier and the deposit of its contents are all controlled automatically by ramps and a rack and pinion device located at various points along the track. The carrier can be lowered manually and is then automatically unloaded when it reaches its destination. The shape of the inner liner (19) is such as to provide a gentle and smooth flow for the ammunition and the liner itself is made of brass, or other suitable material.

5 Claims, 6 Drawing Figures

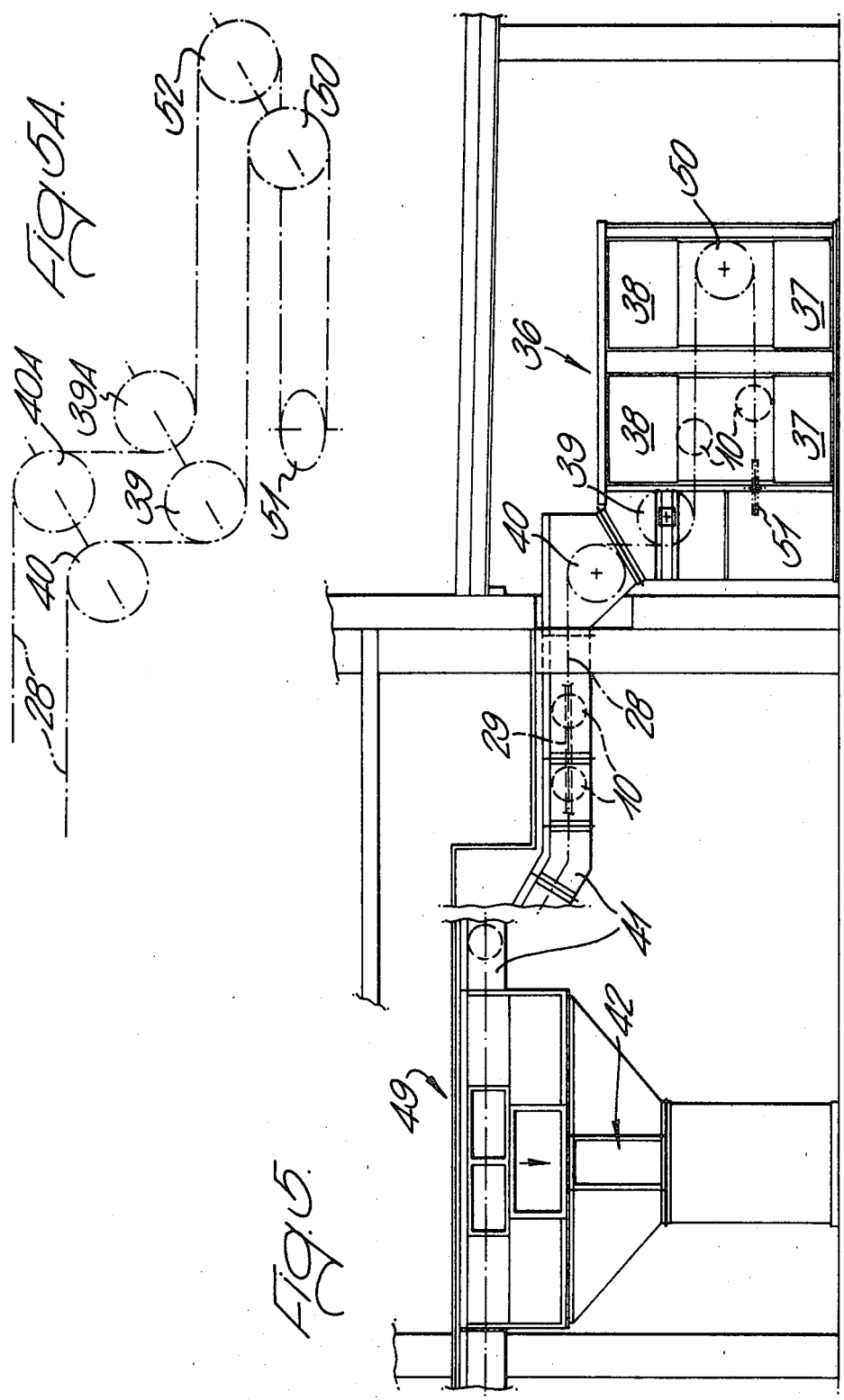

AMMUNITION HANDLING SYSTEM

This invention relates to an ammunition handling system which enables ammunition to be loaded onto a carrier and transferred to a remote point without further manual handling.

The term "ammunition" as used in the specification is used in its broad sense to cover any explosive device, such as a shell, grenade, cartridge, bullet, primer, or other potentially explosive munition.

An object of the invention is to provide an ammunition handling system in which the carrier may be loaded and then transported to a discharge point, at which point the carrier is automatically caused to revolve slowly and gently discharge the ammunition at the desired point.

In accordance with the invention there is an ammunition handling system comprising a carrier for conveying ammunition along a predetermined path, means being provided to arrest and hold the carrier level during a loading operation and a tipping mechanism being provided to cause the carrier to revolve slowly and gently discharge the ammunition at a desired point in the path.

Preferably the carrier includes an inner liner assembly contoured to provide for the smooth, gentle discharge of the ammunition when the carrier is tipped by rotation.

The carrier may have a door moveable automatically from a closed to an open position, and vice versa, as the carrier travels along the path. Catches may be provided by which the door may be held either in its closed or open position, and means may be arranged along the path to release the catches as the carrier moves along the path to enable to door to be opened or closed.

Preferably the carriers are supported by a chain which runs in a track which may include a ramp to prevent the carrier being tipped until the ammunition discharge station is reached.

The tipping mechanism may comprise a rack and pinion, the pinion being located on the carrier and the rack being located on or adjacent the track.

The inner liner assembly is preferably made of brass or other soft metal or plastic, and may be shaped to receive and hold an ammunition box to allow the contents of the box to discharge when the carrier is tipped.

In the accompanying drawings,

FIG. 5 shows the layout of a track on which the carrier runs, and which enables ammunition to be loaded outside an ammunition store and transported into and automatically deposited within the store; and FIG. 5A shows diagrammtically details of the track.

The ammunition handling system comprises a number of carriers supported on shafts on a chain which runs in a track. The carriers have an inner liner which is shaped so as to allow smooth and gentle deposit of the contents of the carrier when the carrier is tipped.

Figure 1:
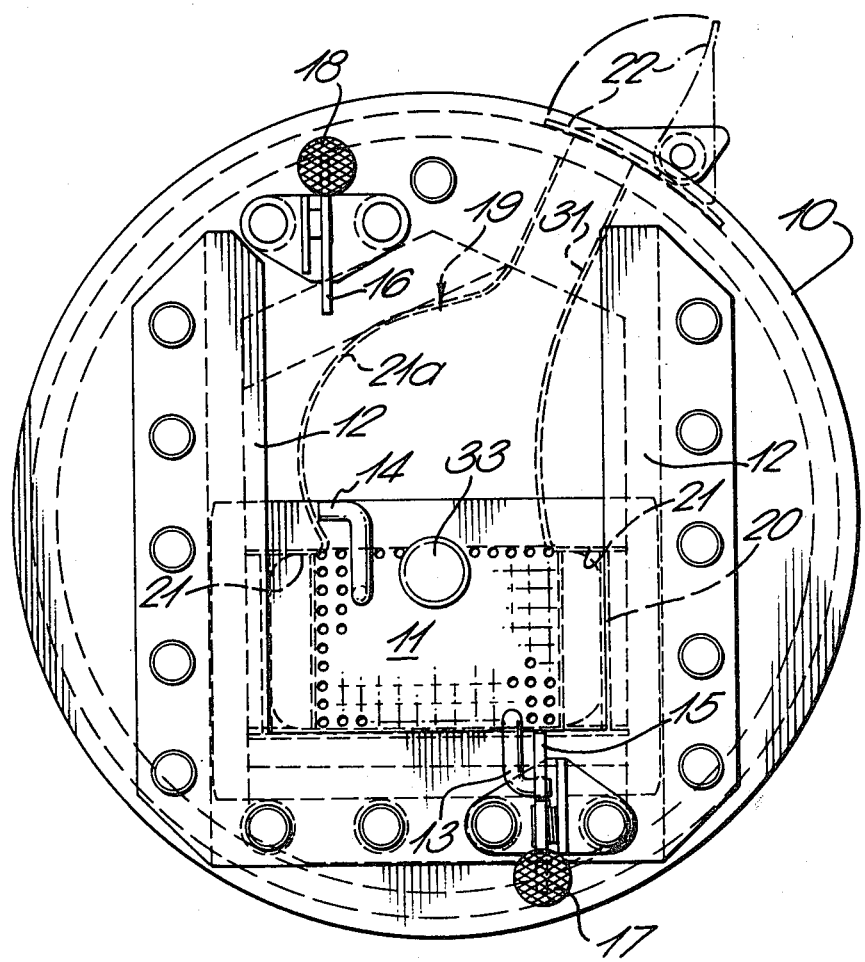
FIG. 1 is a front elevation of an ammunition carrier embodying the present invention.
Figure 2:
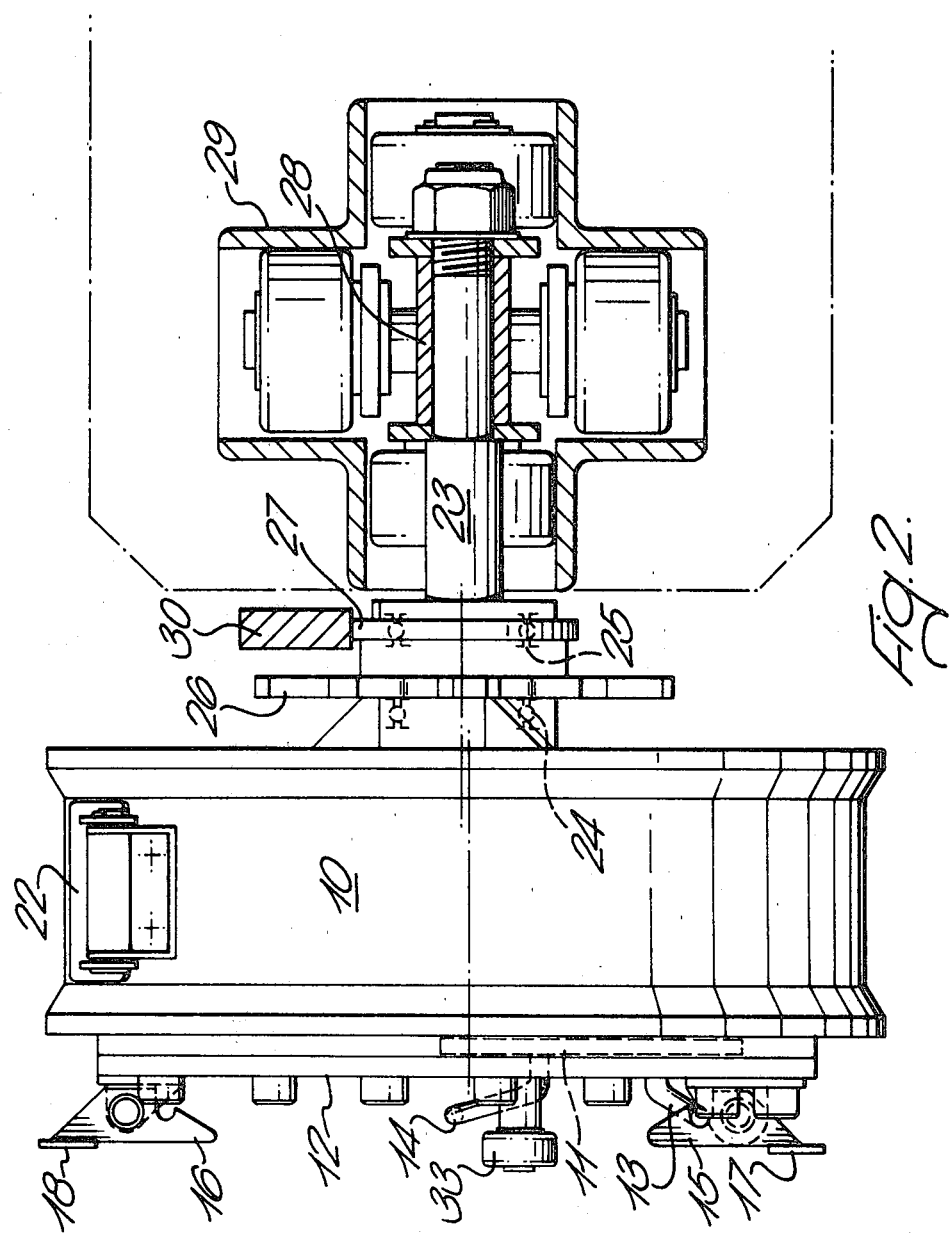
FIG. 2 is an end elevation of the same ammunition carrier showing how it is supported on a chain carried in a track, the chain and track being shown partially in section.

FIGS. 1 and 2 show a typical carrier 10 which is made of stainless steel and has a perforated door 11 slideable vertically in guides 12, so as to expose an access aperture through which boxes of ammunition or primers may be loaded. Attached to the lower edge of the door 11 is a detent 13 which can be engaged and held by a spring-loaded catch 15. Attached to the upper edge of the door is a similar detent 14 engageable by spring-loaded catch 16 (see FIG. 2).

Attached to the respective catches 15 and 16 are pads 17 and 18 engageable by ramps which will cause the catches to lift and release the door.

Within the steel carrier 10 is an inner carrier assembly which is in the form of a brass container 19, which has a lower portion 20 (also FIG. 3) adapted to receive a box of primers or other ammunition, shoulders 21 to prevent the box coming out of the brass liner 19 when the liner and carrier together are tipped, and a bulbous portion 21a (also FIG. 3) which is shaped so as to provide a gentle and smooth flow-path for primers or other ammunition as they are tipped out of the carrier. The liner 19 is normally closed by a hinged door 22 adapted to swing open to the position shown in dotted lines when the container is rotated.

As shown in FIG. 2, the carrier 10 is supported on a shaft 23 via bearings 24 and 25. It carries a tipping gear 26 and a level cam 27. The shaft 23 is attached to a chain 28 which runs in a cruciform track 29.

As the carrier moves along with the chain in the track, the level cam 27 engages a pressure bar or level ramp 30 which is fixed to the track, so as to maintain the carrier in its vertical position.

Figure 3:
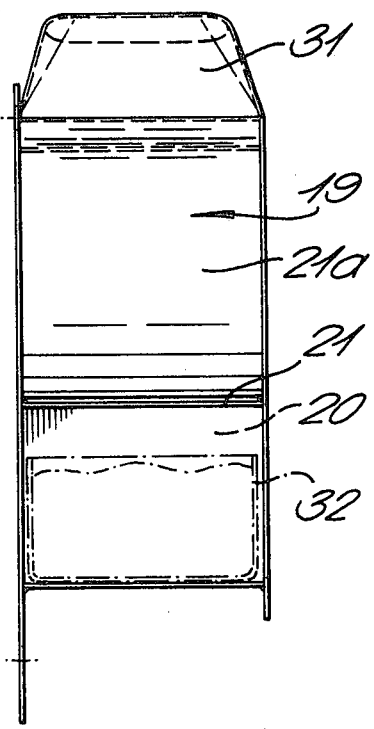
FIG. 3 is an end elevation of an inner carrier assembly or liner.

The liner 19 is shaped with a chute-like mouth 31 as seen in FIG. 3. The box of primers 32 can also be seen in this Figure below the shoulder 21.

Attached to the door 11 is a door roller 33 FIGS. 1 and 2 which is adapted to engage a ramp 34 (FIG. 4) mounted on the track below the level ramp 30.

Figure 4:
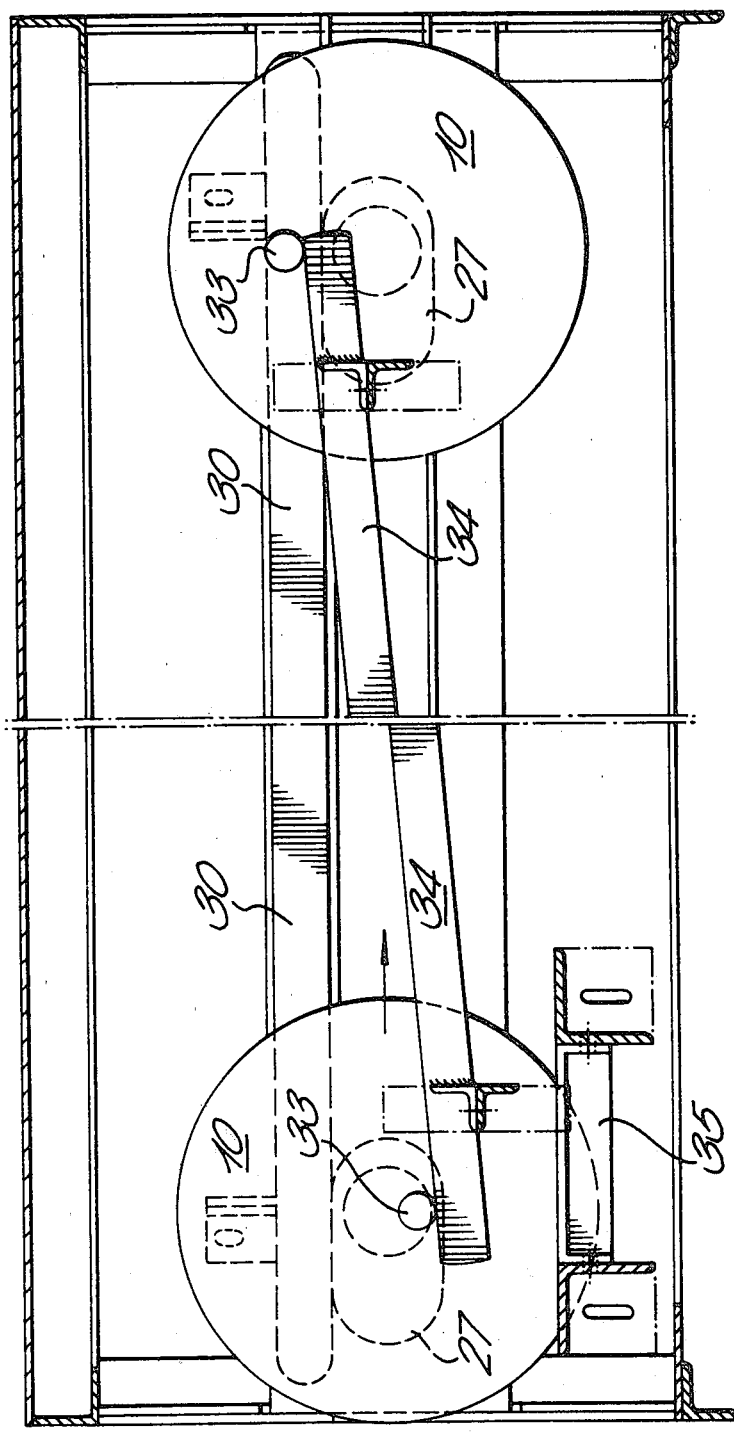
FIG. 4 is a side elevation somewhat diagrammatically part of the track on which the carrier runs, together with the ramp of opening the door of the carrier.

When the door roller 33 of each ammunition carrier 10 reaches the position shown at the left-hand end of FIG. 4, the lower door catch 15 (FIGS. 1 and 2) will be released by engagement of a door ramp 35 with the pad 17 (FIGS. 1 and 2), the roller 33 will ride up the ramp 34, and the door will be raised. The carrier will not turn at this time because the level cam 27 will continue to engage the pressure bar 30.

When the door reaches its uppermost position, the detent 14 will engage catch 16 and thus the door will be held in its uppermost position. At this point the carrier can be loaded by inserting a box of primers through the door aperture so that it will rest in the lower portion 20 of the liner 19 (FIG. 1).

A little further on the upper door catch 16 will be released by a ramp, not shown but similar to the door ramp 34, engaging the pad 18 so the door will automatically close under the influence of gravity.

When the unloading station is reached, the tipping gear 26 will engage a rack mounted on the track, the level ramp 30 will end, thus allowing the carrier to tip and the carrier will be tipped, anti-clockwise as shown in FIG. 1, so as to bring the mouth of the inner liner down to the point where the contents of the box will gently and smoothly run out along the shaped inner liner 19 (FIG. 1) and be deposited in an appropriate receptacle.

As the carrier continues on its way, it will swing back into the vertical position and the level cam will engage the pressure bar of level ramp so as to maintain the carrier vertically until it reaches the loading station.

FIG. 5 illustrates the track and the loading and unloading stations.

FIG. 5 illustrates one example of an ammunition handling system embodying the invention and using the ammunition carrier described above. A series of the ammunition carriers 10 are attached to a chain 28 of the form described with reference to FIG. 2. The chain runs in a track 29 and in FIG. 5 the chain is simply shown as a single line 28. Where it passes over sprockets the track is temporarily discontinued.

At the right hand side of FIG. 5 is shown a loading station 36 which has bi-parting doors 37,38.

A series of the carriers 10 are attached to the chain 28 at intervals and the chain runs over a number of sprockets 39, 40 etc. along a continuous path from the loading section 36 to an unloading area 49.

Loading can be achieved from both sides of the loading area. The loaded carriers proceed along an enclosed path 41 which may be of armoured steel for example and eventually reach the unloading area where they automatically unload and tip the contents, for example primers, into a receiving area 42.

The unloaded primers may then enter a machine, details of which are not relevant, for inserting the primers into shells.

The unloading area may be totally enclosed in explosion proof buildings and thus the access at the loading area through the doors 37 and 38 may be completely remote from and protected against explosions occurring within the handling plant.

Since the chain 28 is a continuous chain running over a series of sprockets the ammunition carriers once they are unloaded are returned to the loading area again to be reloaded.

The run of the chain 28 through the loading station 36 is shown diagrammatically in FIG. 5A.

After passing over the pulleys 40 and 39 the chain continues over pulley 50, back underneath its own path to pulley 51 and then via pulley 52 (FIG. 5A to pulley 39A and 40A) thus completing the circuit.

The tipping mechanism may comprise a system of pins and a cam located on the carrier or rack.

I claim:

1. An ammunition handling system comprising a carrier for holding ammunition, conveyor means connected to said carrier for moving said carrier and thus conveying ammunition along a predetermined path, cooperating means on said carrier and along said path for arresting and holding said carrier level during a loading operation and an automatic tipping mechanism for engaging said carrier to cause said carrier to revolve slowly and thus gently discharge the ammunition at a selected point along said path, said carrier including an inner liner assembly contoured to receive ammunition in a first orientation of said carrier for smoothly and gently discharging ammunition when said carrier is tipped from said first orientation, said inner liner assembly having a shape defining means for receiving and holding an open top ammunition box while allowing the contents of such ammunition box to individually discharge when the carrier is tipped.

2. Ammunition handling system according to claim 1 and in which the carrier has a door and including means to move the door automatically from a closed to an open position and vice versa, as the carrier travels along said predetermined path.

3. Ammunition handling system according to claim 2 and including catches by which the door is held in either its closed or open position and release means along said path positioned so as to engage the respective catches as the carrier moves along the path.

4. Ammunition handling system according to claim 1 and said conveyor means including a chain with the chain being arranged to support the carrier, the chain running in a track and said cooperating means including a ramp to prevent the carrier from being tipped until said selected point which is an ammunition discharge station is reached.

5. An ammunition handling system according to claim 4 and in which the tipping mechanism comprises a rack and pinion, the pinion being located on the carrier and the rack being located on or adjacent the track.

* * * * *